United States Patent [19]

Conbere

[11] 4,104,225

[45] Aug. 1, 1978

[54] METHOD OF MAKING A COATING COMPOSITION CONTAINING A FLUOROCARBON POLYMER RESIN AND AN ALUMINUM CONTAINING BINDER

[75] Inventor: John P. Conbere, Holmdel, N.J.

[73] Assignee: Imperial Chemical Industries Limited, London, England

[21] Appl. No.: 643,868

[22] Filed: Dec. 23, 1975

Related U.S. Application Data

[63] Continuation of Ser. No. 459,700, Apr. 10, 1974, abandoned, which is a continuation of Ser. No. 207,644, Dec. 13, 1971, abandoned.

[30] Foreign Application Priority Data

Nov. 26, 1971 [GB] United Kingdom ............... 54948/71

[51] Int. Cl.$^2$ ............................................. C08L 27/18
[52] U.S. Cl. ..................... 260/29.6 F; 260/29.6 MM; 260/29.6 MP; 260/29.6 MQ; 260/29.6 MN; 428/500; 526/2; 526/4
[58] Field of Search .................................... 260/29.6 F

[56] References Cited

U.S. PATENT DOCUMENTS

| 3,234,311 | 2/1966 | Pratt et al. .......................... 264/127 |
| 3,489,595 | 1/1970 | Brown .............................. 260/29.6 F |
| 3,634,353 | 1/1972 | Strolle ............................. 260/29.6 F |
| 3,644,261 | 2/1972 | Strolle ............................. 260/29.6 F |
| 3,692,727 | 9/1972 | Peschko ........................... 260/29.6 F |

FOREIGN PATENT DOCUMENTS

| 755,148 | 3/1967 | Canada ............................... 260/29.6 F |
| 1,527,104 | 4/1968 | France. |
| 1,536,986 | 7/1968 | France. |
| 1,537,129 | 7/1968 | France. |
| 1,719,340 | 8/1971 | Fed. Rep. of Germany. |
| 1,019,202 | 2/1966 | United Kingdom. |
| 1,030,385 | 5/1966 | United Kingdom. |
| 1,044,654 | 10/1966 | United Kingdom. |
| 1,226,222 | 3/1971 | United Kingdom. |

*Primary Examiner*—Harold D. Anderson
*Attorney, Agent, or Firm*—Cushman, Darby & Cushman

[57] ABSTRACT

Compositions of fluorocarbon polymers, especially PTFE, including a binding means made by reacting hydrochloric acid and phosphoric acid with aluminum hydroxychloride.

16 Claims, No Drawings

METHOD OF MAKING A COATING COMPOSITION CONTAINING A FLUOROCARBON POLYMER RESIN AND AN ALUMINUM CONTAINING BINDER

This is a continuation of application Ser. No. 459,700, filed Apr. 10, 1974, now abandoned, which application is, in turn, a continuation of application Ser. No. 207,644, filed Dec. 13, 1971, now abandoned.

This invention relates to fluorocarbon polymer compositions. In particular it relates to dispersions of fluorocarbon polymers in liquid media and dry mixtures containing fluorocarbon polymers. The invention also relates to methods of making such compositions and to methods of coating substrates using compositions in liquid media. It further relates to articles made from or made by use of fluorocarbon polymer compositions.

The compositions of this invention include aluminium phosphates. In some embodiments of the invention, the phosphates are in the form of complexes as subsequently described. The phosphates may be dispersed in or dissolved in a liquid medium in which the fluorocarbon polymer is dispersed. In other embodiments of the invention the complex phosphates are in admixture with the fluorocarbon polymer in a dry state.

Compositions according to the invention may include a fluorocarbon polymer dispersed in an acidic aqueous medium in which an aluminium phosphate is in solution.

Liquid fluorocarbon dispersions may for example be applied to substrates to obtain coatings of fluorocarbon polymers. Dry mixtures may be used as moulding powders.

By fluorocarbon polymers there are included polytetrafluoroethylene (PTFE) and copolymers of tetrafluoroethylene with up to 15% by weight of other monomers such as ethylene, vinyl chloride and hexafluoropropene. Preferred fluorocarbon polymers are polytetrafluoroethylene and copolymers of tetrafluoroethylene with up to 5%, especially 0.05 to 2%, by weight of other monomers such as ethylene, vinyl chloride and hexafluoropropene. Such preferred polymers are subsequently referred to as "TFE resins".

According to one aspect of this invention there is provided a fluorocarbon polymer composition including a fluorocarbon polymer (especially a TFE resin) and a halogen-containing complex phosphate of aluminium containing a chemically bound hydroxy copound R-OH (of which there is preferably at least one molecule per atom of aluminium) where R is a hydrogen atom or an organic group.

The invention further provides a composition comprising a fluorocarbon polymer and a binder or filler means including, each in combined form, aluminium, phosphorus and the elements of a mineral acid, wherein the ratio of the number of atoms of aluminium to the number of the atoms of phosphorus is $1:x$ where $x$ is up to 2, preferably where $x \leq 1.8$, and more preferably from 0.5 to 1.5. By the term "mineral acid" there is intended hydrochloric, sulphuric or nitric acid.

There is also provided a fluorocarbon polymer composition containing a binder or filler means in the form of an ionic or covalent material including the atoms or groups

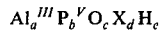

wherein $a$, $b$, $c$ and $e$ are respectively the numbers of the atoms shown and $d$ is the number of the units X, X being a halogen e.g. Cl or Br or being considered as derived from a mineral acid by the removal of one or more acidic hydrogen atoms whether a mineral acid as such has been used in the preparation of the binder or filler or not (whereby X may also be Cl as well as e.g. $SO_4$ or $NO_3$) characterised in that either the ratio $a:d$ is from 1:0.1 to 1:5 or the ratio $a:b$ is $1:x$ where $x$ is up to 2, preferably where $x \leq 1.8$ or both. The ratio $a:b$ is more preferably from 1:0.5 to 1:1.5. The binder or filler means may be a halogen-containing complex phosphate as previously described (including such complexes in a hydrolysed form) or may be in the form of aluminium ions, phosphate ions and the ions of a mineral acid present in an aqueous medium.

According to further aspects the invention provides compositions comprising dispersions of a TFE resin in a solution of a binder which may be made in various ways as follows:

(a) by the addition of a mineral acid to an aluminium phosphate;

(b) by the addition of a phosphoric acid to aluminium chloride, sulphate or nitrate; or (c) by the addition of a phosphoric acid and optionally a mineral acid to a material of the formula

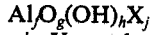

wherein X may be Cl, $NO_3$ or $SO_4$ and when X is Cl or $NO_3$ $3f = 2g + h + j$ and when X is $SO_4$ $3f = 2g + h + 2j$; in all cases either $g$ or $h$ but not both may be zero; $j$ may be zero; and the formula represents a single compound or a mixture of compounds, each of which may or may not by hydrated.

There is also provided an aqueous composition containing a binder means which has been prepared by reacting an aluminium halide or oxyhalide in the presence of water with a phosphoric acid.

Compositions according to the invention may contain, in addition to the constituents already described, the elements of acids other than mineral acids, phosphoric acids and chromic acid. It is preferred that the elements of mineral acid and phosphoric acid anions should predominate among the elements of acid anions as a whole and excluding anions derived from stabilisers which may be used with the fluorocarbon polymer, the ratio of the number of mineral acid and phosphoric acid anions to acid anions as a whole (whether the anions are in dissociated form or not) should exceed 50:50 and preferably exceed 80:20. It is especially preferred that the ratio should exceed 100:1.

Generally when the compositions are in liquid form the constituents are dispersed in a liquid medium. Depending on their properties the binder or filler means or the complex phosphate either becomes dissolved in the liquid medium or exists in the form of an emulsion or suspension. Liquid compositions may include other components such as buffers, pigments and fillers such as graphite.

A method according to the invention of coating a substrate comprises applying to the substrate a liquid composition as above set forth to form a coating, and heating the coating to remove the volatile components and form an adherent coating. More than one coat may be applied in this way.

The method of the invention may be used e.g. for bonding the polymer to metal, glass and ceramic materials. The method may thus be used for the bonding of a flurocarbon polymer to a metal surface e.g. to an iron, iron alloy, aluminium or aluminium alloy surface or to a composite surface such as a metal surface bearing a ceramic, metal or metal + metal oxide frit which has been applied by spraying e.g. flame spraying.

Aqueous aluminium phosphate complex containing compositions are also useful for impregnating a variety of materials such as glass cloth, porous metals, or other supporting substrates as described in our United Kingdom Patent Specification 1,163,423. The impregnated material is heated at a temperature of, for example, 100°–180° C to convert the complex aluminium phosphate to the hard, abrasion resistant aluminium phosphate or at a temperature sufficient to sinter the fluorocarbon in the composition.

When the composition includes an aqueous dispersion of TFE resin as above mentioned the coating may be dried to remove substantially all the volatile components of the coating and it may subsequently be sintered, preferably after application to it of a top coat of an aqueous TFE resin dispersion not including a binding material. By means of the sintering process, an adherent coating of TFE resin may be obtained on the substrate.

It is not essential that coatings containing complex aluminium phosphates should be sintered as the adhesion created on the decomposition of the complex can in suitable cases be relied on to bond the polymer to the substrate. However, when TFE resins are being used, sintering is preferred.

The complex aluminium phosphates used in the compositions of the present invention may be made as described in Dutch Patent Application 70,08594, the disclosure of which as to their method of preparation, properties and so far as relevant their manner of use, is incorporated herein by reference.

As described in the said Application, the complex phosphates or a mixture containing the said complex phosphate, for example their solutions, may be prepared, for example, by reacting aluminium or an aluminium compound, preferably a halide, with a hydroxy compound R—OH and phosphoric acid, a phosphoric acid ester or a compound capable of forming phosphoric acid or a phosphoric acid ester. The aluminium halide may be a simple halide or an oxyhalide or an aluminium alkoxy halide, for example aluminium ethoxy chloride. Other suitable aluminium compounds include aluminium alkoxides, for example aluminium ethoxide. When aluminium or an aluminium compound other than a halide is used, the presence of a halogen acid is necessary. Mixtures of hydroxy compounds may be used. Substances capable of forming phosphoric acid or a phosphoric acid ester include phosphorus pentoxide, phosphorus oxyhalides and phosphorus halides. An aqueous solution of phosphoric acid may be used, conveniently an 88% solution of orthophosphoric acid in water, although it is preferred to ensure that no more than about 5% by weight of water based on the total weight of reaction mixture is present when a complex phosphate containing an organic hydroxy compound is prepared, thereby avoiding a loss of yield.

The order in which the reactants are added to one another is not critical; it is preferred to add the aluminium compound to the hydroxy compound and then to react the phosphoric acid or phosphoric acid ester with the resultant mixture. It is convenient to dissolve the aluminium compound in a suitable solvent, which may be either the hydroxy compound or an inert solvent, before reacting it further.

The highest yields of product are obtained when the molar ratio of aluminium to phosphorus in the reaction is substantially 1:1.

The reaction may be carried out over a wide range of temperature, but generally it is preferred to use a temperature below 60° C and preferably from 0° C to 50° C, to obtain optimum yields.

It is preferred, for example, when it is desired to preserve anhydrous conditions, to carry out the reaction in an atmosphere of a dry inert gas, for example, nitrogen.

Complex phosphates according to the invention containing chemically-bound water molecules or a mixture containing the said complex phosphate may also be prepared by the hydrolysis of another complex phosphate of the type herein described which contains a chemically-bound organic hydroxy compound, or by carrying out the reactions hereinbefore described in the presence of water. By this means it is possible to replace, wholly or partially, the organic hydroxy compound with water molecules. There may be used as starting material the complex phosphate later described having the empirical formula $AlPClH_{25}C_8O_8$. The partially hydrolysed product may be a single substance containing both chemically-bound water and the organic hydroxy compound or it may be a mixture of, for example, wholly hydrolysed and unhydrolysed molecules of the original complex phosphate. Polymerisation of the hydrolysis product may accompany hydrolysis so that higher molecular weight products of the invention are formed. Hydrolysis may be effected by any convenient means, but for many of the compounds of the invention it is sufficient to add water at room temperature or to keep the compounds in contact with moist air for a sufficient time. Conveniently this is done by fluidising the compound in a stream of humidified air, preferably at a temperature below 80° C.

In an alternative method for preparing a hydrated complex aluminium phosphate, aluminium orthophosphate hydrate, preferably the trihydrate $AlPO_4 3H_2O$, may be contacted with a reactant gas comprising halogen acid gas and/or a gaseous halogen. The halogen acid gas, preferably hydrochloric acid, may be diluted with an inert gas and then contacted with aluminium phosphate hydrate preferably at a temperature not exceeding 100° C desirably not exceeding 50° C.

On heating these complex phosphates at relatively low temperatures, for example above 80° C and in particular at temperatures within the range 100°–180° C, they decompose evolving a hydrogen halide and the compound R—OH, to form a hard abrasion resistant aluminium phosphate which may include an aluminium phosphate in a polymeric form.

If the complex phosphates are applied to a substrate such as a ceramic, glass or a metal in the form of a solution in a suitable solvent, for example water, or an alcohol such as methanol or ethanol, the solution containing dispersed fluorocarbon polymer, it is found on removing the solvent and heating to decompose the complex aluminium phosphate, that the latter forms a strongly adherent coating on the substrate that is stable to high temperatures, and assists in binding the fluorocarbon polymer to the substrate. A coating can thus be produced possessing the desirable properties of the fluorocarbon polymer and at the same time having further advantageous properties donated by the aluminium phosphate, namely strength and refractoriness, the aluminium phosphate as well as the fluorocarbon polymer exhibiting chemical inertness.

The solution of complex phosphate may include a material or materials which control the physical nature of the solid phase or aluminium phosphate which is produced from the solution, for example by heating. When the solvent comprises water there may be used a crystallization stabiliser, for example finely divided silica or alumina, or a nucleation activator or catalyst, for example dibutyl peroxide, or calcium, magnesium or sodium chloride. When the solution of the complex phosphate is non-aqueous, for example when the solvent is ethanol, there may be used a boric acid ester or ether or a silicic acid ester or ether, for example methyl borate, trimethoxy boroxine or ethyl silicate to suppress the crystallisation of aluminium phosphate.

Preferably the halogen in the complex aluminium phosphate is chlorine. The ratio of the number of gram atoms of aluminium to the number of gram atoms of phosphorus in the complex phosphates of aluminium may vary over a wide range, for example from 1:2 to 2:1, but is preferably substantially 1:1.

Complex phosphates having this ratio decompose at low temperatures directly to form aluminium orthophosphate having greater chemical stability and refractoriness than aluminum phosphate formed from complex phosphates with other ratios. The ratio of the number of gram atoms of aluminium to the number of gram atoms of halogen in the complex phosphates is preferably substantially 1:1.

In the complex phosphates, R may be an aliphatic hydrocarbon or substituted hydrocarbon group; in particular it is preferred when R—OH is organic that it is an aliphatic alcohol containing 1-4 carbon atoms, particularly ethanol. There may be 1 to 5 molecules of a hydroxy compound R—OH in the complex molecule. As a typical example a complex aluminium phosphate containing chemically-bound water may have an empirical formula $AlPClH_{11}O_9$ which can be designated aluminium chlorophosphate hydrate; a further example is a complex aluminium phosphate containing ethyl alcohol and having an empirical formula $AlPClH_{25}C_8O_8$ which can be designated aluminium chlorophosphate ethanolate. It must be understood that these designations in no way imply any particular molecular structures for the compounds.

The complex aluminium phosphates wherein R is a hydrogen atom are water soluble. The complex aluminium phosphates wherein R is organic such as an aliphatic hydrocarbon or substituted hydrocarbon group are soluble in water and organic solvents, especially polar organic solvents. Preferred organic solvents are oxygen containing polar solvents such as lower aliphatic alcohols, especially methanol or ethanol. It is believed that in water the complex aluminium phosphates wherein R is organic hydrolyse to form complex aluminium phosphates wherein R is hydrogen. Consequently, there is generally little advantage, in the present invention, when the fluorocarbon is dispersed in an aqueous phase, of using complex aluminium phosphates wherein R is organic, although in some cases the use of complex aluminium phosphates wherein R is an alkyl group containing 1 to 4 carbon atoms gives similar results ro the use of complex aluminium phosphates wherein R is hydrogen.

A composition according to the invention may conveniently be made by dissolving a complex aluminium phosphate as above described in an equal weight of water, diluting as necessary and adding the solution to a stabilized fluorocarbon dispersion.

In an alternative method of preparing a composition according to the invention, an aluminium and phosphate containing solution or suspension to act as binder may first be formed and this may subsequently be blended with a fluorocarbon polymer e.g. a TFE resin dispersion. Various routes may be used to give solutions. For example, an aluminium phosphate may be dissolved in a mineral acid. Where aluminium orthophosphate is used, suitable proportions are 1 mole of aluminium orthophosphate to 0.1 to 5, preferably 0.25 to 4 moles of the acid. For example, suitable binding may be made by dissolving aluminium orthophosphate in an equimolar proportion of hydrochloric acid to give a solution containing Al, PO$_4$ and Cl ions in the ratio 1:1:1.

Another route is to dissolve aluminium chloride, sulphate or nitrate in a phosphoric acid. In the case of orthophosphoric acid and aluminium chloride, a typical amount will be 1 mole of the acid to 1 mole of aluminium chloride.

Specific cases of the foregoing may be represented by the following equations:

$$AlPO_4 + HCl + solvent \rightarrow solution$$

$$AlCl_3 + H_3PO_4 + aq. \rightarrow AlPO_4 + 3HCl + aq.$$

In the second case, it is possible to maintain equivalent amounts of aluminium and phosphate ions in the resulting solution and to reduce the relative amount of acid produced from the mineral acid anion in the aluminium salt by using in addition to the salt some aluminium hydroxide or aluminium oxide as exemplified in the equation below:

$$Al_2O_3.aq. + 2AlCl_3 + 4H_3PO_4 + aq. \rightarrow 4AlPO_4 + 6HCl + aq.$$

It will be seen that according to the foregoing equation, 1.5 moles of HCl are produced to each mole of aluminium phosphate compared with 3 moles in the previous equation and this quantity may be reduced further by use of more aluminium oxide or hydroxide relative to the aluminium chloride or other aluminium salt which is dissolved in the phosphoric acid.

Acid aluminium phosphates e.g. $Al_2(HPO_4)_3$ may be used in place of aluminium orthophosphate and phosphoric acids other than orthophosphoric may also be substituted for orthophosphoric acid. Generally, solutions or suspensions may be made from any starting materials which will provide aluminium and phosphate and the elements of a mineral acid in combined or ionic form in such a manner that the solution or suspension may be mixed with a suitably stabilised fluorocarbon polymer dispersion without coagulating the dispersion and so as to form a reasonably homogeneous composition. Such solutions or suspensions may subsequently be referred to as aluminium phosphate-acid mixtures but this does not imply any particular method of preparation. After preparation, the solutions can be filtered if necessary before blending with the fluorocarbon dispersion.

A further route for obtaining such a mixture is to add a phosphoric acid and optionally a mineral acid to a material of the formula $$Al_fO_g(OH)_hX_j$$

wherein X may be Cl, NO$_3$ or SO$_4$, when X is Cl or NO$_3$ 3$f$ = 2$g$ + $h$ + $j$, when X is SO$_4$ 3$f$ = 2$g$ + $h$ + 2$j$; in all cases either $g$ or $h$ but not both may be zero but when X is Cl for one embodiment, $h$ is zero; $j$ may be zero; and the formula represents a single compound or mixture of compounds, each of which may or may not be hydrated.

The above mentioned modification of the preceding route whereby a mixture of aluminium hydroxide or oxide and aluminium chloride is treated with orthophosphoric acid is added is an example of this. Another example is the reaction between hydrochloric acid and orthophosphoric acid an aluminium hydroxychloride which can be represented by the following equation:

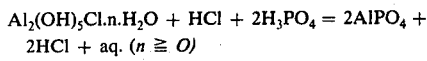
Al$_2$(OH)$_5$Cl.n.H$_2$O + HCl + 2H$_3$PO$_4$ = 2AlPO$_4$ + 2HCl + aq. ($n \geq O$)

In this case aluminium orthophosphate is obtained in solution when orthophosphoric acid is used together with hydrochloric acid. The use of other phosphoric acid is, however, within the scope of this invention. In this embodiment, $h$, as defined above, is not equal to zero.

In compositions made by the foregoing routes, the number of atoms of aluminium to the number of atoms of phosphorus present in the phosphate is 1:$x$ where $x$ is up to 2, preferably where $x \leq 1.8$ and $x$ is more preferably 0.5 to 1.5

When the composition contains the fluorocarbon polymer dispersed in a liquid medium, the dispersion may be in an aqueous or an organic medium and the dispersion may be made by a polymerisation process in an aqueous or an organic medium or by dispersing a suitably finely divided solid form of the polymer in a liquid medium. In the case of PTFE for example, the polymer may be used in the form of a dispersion obtained from a polymerisation process in aqueous or organic media or a dispersion may be made by comminuting a suitable solid form of PTFE and dispersing it in a liquid, the comminution being effected preferably while the PTFE is suspended in a liquid medium in the presence of a dispersing agent. Sufficient dispersing agent is used to make a stable dispersion which will remain stable after addition of an aluminium phosphate complex or aluminium phosphate-acid mixture.

There will first be described the preparation of aqueous dispersions of PTFE made by an aqueous polymerisation process. In this, the tetrafluoroethylene is normally polymerised in the presence of an emulsifying agent, for example by the processes described in United Kingdom Patent Specifications 689,400 and 821,353. The emulsifying agent is preferably of the anionic type in the form of a fluorinated carboxylic acid compound such as ammonium perfluorooctanoate. For use in this invention, after polymerisation, the dispersion is further stabilised by means of a surfactant and, if necessary, concentrated. We have found that the best results are achieved if the additional stabilisation is effected by a non-ionic surfactant such as polyoxyethylated octyl phenol containing 9-10 moles of ethylene oxide per mole of octyl phenol or a polyoxyethylated secondary decanol containing 9 moles of ethylene oxide per mole of decanol.

Stabilisation solely by the use of ionic surfactants is desirably avoided. Also we have found that the addition of too much non-ionic surfactant is in some cases undesirable and so we prefer, for optimum results, to use a PTFE dispersion containing less than 4% by weight, based on the weight of PTFE in the dispersion, of a non-ionic surfactant together with any anionic surfactant which may remain after the polymerisation process. Normally at least 1% by weight, based on the weight of PTFE in the dispersion, of a non-ionic surfactant is necessary to donate sufficient stability and shelf life to the dispersion prior to the addition of an aluminium, phosphate and acid-containing mix and to ensure stability of the dispersion after the mix has been added.

Use of anionic hydrocarbon stabilisers based on sulphates or sulphonates in PTFE-containing compositions tends to result in PTFE coagulation when complex aluminium phosphate or aluminium phosphate-acid mixtures are added. It is believed that aluminium hydrocarbon sulphates or sulphonates tend to precipitate leaving less stabiliser to stabilise the PTFE.

In the manufacture of non-stick metal cookware, it is desired to obtain by sintering a uniform and adherent coating of a fluorocarbon resin, usually PTFE, on a metal base. The use of PTFE has presented problems because of the difficulty of anchoring PTFE to a substrate due to its low friction properties and inability to melt to a liquid form.

One method of obtaining an adherent layer has been to apply a primer coat of a PTFE dispersion containing chromic acid and to follow this after drying and baking with a PTFE-containing top coat. The whole coating is then sintered. However, the use of chromium compounds is objected to in some instances for utensils which are to contact foodstuffs.

It has been found that by use of compositions as above described wherein the fluorocarbon polymer is a TFE resin dispersed in an aqueous medium (subsequently referred to as "aqueous TFE resin compositions") good adhesion to metal e.g. aluminium substrates and metals coated with a ceramic frit may be obtained. The compositions may be applied as primer coatings to such substrates which are then dried and baked. Subsequently a TFE resin top coat not containing a binding material may be applied e.g. by spraying and the combined coating sintered.

Whereas in using a chromic acid-containing primer as previously described baking temperatures should usually be at 235°–260° C, it is found that aqueous TFE resin compositions used as primers may be baked at temperatures as low as 120°–150° C. This applies both in the case where the binder is a complex aluminium phosphate and where it is an aluminium phosphate acid mixture. Use of these compositions as primer coats therefore has the advantage of allowing lower baking temperatures which lessens the risk of damage to certain substrates and also allows economies in production, as well as providing coatings which are free from toxic chromium compounds. It has been found that sintered coatings employing as primers aqueous PTFE resin compositions according to preferred forms of the invention and a PTFE top coat may have at least as good adhesion as coatings using primers containing chromic acid and be resistant to repeated contact with hot liquids.

By suitable choice of compositions for the primer and top coats, and of thicknesses and temperature cycles, an adherent PTFE coating can be obtained which is smooth and substantially free from cracks, pinholes, blisters and discoloration.

It has been found for example that frying pans, milk pans and saucepans which were coated as above described have remained in constant use for approximately eleven months without the coatings becoming impaired. The pans in question had been coated with a primer coat according to the invention and dried and baked and then top-coated with a PTFE dispesion which was dried prior to the whole coating being sintered. Preferred sintering temperatures for PTFE are 360°–390° C.

The aqueous compositions of the invention containing dispersed TFE resins may be applied as coatings to a variety of substrates, including glass, e.g. for non-stick ovenware and non-stick autoclave linings; ceramics; composite surfaces such as a metal; metals such as ferrous metals, for example cast iron, mild steel, stainless steel, and aluminium and its alloys; and composite surfaces such as metals having a reinforcing coating, such as a sprayed ceramic and/or metal powder coating.

The compositions are particularly suited to coating cooking utensils, for example frying pans, saucepans and bakeware or for oven linings. In making cooking utensils, a blank may be coated and then formed, or an already formed utensil may be coated.

Compositions according to the invention may also be used to form adherent non-stick, low friction, coatings on many other articles including industrial processing equipment including moulds, rollers, stirrers, mixers, chutes, hoppers and heat sealing jaws, domestic articles such as iron sole plates, food mixers and ice separators and tools such as saw blades.

The substrates to which the coating compositions are applied should be clean and free from grease and unless they have a fritted surface are preferably roughened, for example by abrading by grit blasting or by etching. Coatings may be applied by any of the conventional techniques, including spraying, dipping and brushing.

In aqueous compositions of the present invention containing dispersed TFE resins, the resin will usually be present in an amount from 1 to 60%, preferably 10 to 50% by weight based on the total weight of the composition. The weight of aluminium is generally from 0.2 to 8%, preferably 0.5 to 6% and especially 1 to 4% by weight based on the total weight of the composition. In typical compositions, the TFE is present in an amount from 15 to 40% by weight and the aluminium in an amount from 0.5 to 2.75% by weight, both based on the total weight of the composition. A further illustration is a composition comprising 20–40% by weight, based on the total weight of the composition, of PTFE dispersed in an aqueous medium, and, dissolved in the aqueous medium, a stabiliser for the PTFE dispersion, 30% by weight, based on the weight of PTFE, of aluminium orthophosphate and 1 mole of hydrochloric acid for each mole of aluminium orthophosphate.

Referring now to the relationship between the amount of aluminium in the compositions to the amount of TFE resin (indicative of the amount of binding material relative to polymer), the fraction (weight of aluminium)/(weight of TFE resin) should be from 0.02 to 0.25, more preferably 0.02 to 0.12.

The pH of aqueous compositions according to the invention is preferably maintained below 3 to reduce the risk of precipitation of aluminium-containing materials e.g. aluminium phosphate which can happen if the pH is allowed to rise above this figure. Such precipitation would reduce the effectiveness of the compositions in forming adherent coatings.

On drying and baking aqueous primer coatings made from compositions according to the invention, volatile constituents are driven off. These constituents are believed to include, besides the solvent, some or all of the hydroxy compound R—OH in the case of complex aluminium phosphates, and in the case of aluminium phosphate-acid mixtures, some or all of the mineral acid present (whether this was added as such when the binder was made or is present as a result of the mixture which has been created).

In either case, allowing for any products of interreaction between the binder and the substrate, it is believed that the baked coating consists predominantly of the fluorocarbon polymer and aluminium phosphate in intimate interlocking relationship. The coating forms a cohesive mass adhering to the substrate. When the coating is based on a TFE resin and is sintered (e.g. when a TFE resin top coat is applied after the baking step and the two coats are sintered together) the resin in the primer coating is sintered while in admixture with the aluminium phosphate, as the baking step normally employed prior to application of the top coat will transform the components of the binder substantially to aluminium phosphate.

Liquid binding means of the kinds herein described may be prepared in concentrations suitable for use with fluorocarbon polymer dispersions and the binding means and dispersions may be packaged separately prior to mixing and use. The invention therefore extends to packaged dispersions and packaged binding means, e.g. binder solutions, suitable for use therewith.

Regarding non-aqueous polymerisation processes, tetrafluoroethylene may be polymerised in a wide variety of non-polymerisable organic liquids to provide PTFE organosols as described in U.K. Specification 583,874. Copolymerisation of tetrafluoroethylene with other monomers in an organic solvent is disclosed in U.K. Specification 583,482.

The fluorocarbon polymers need not necessarily have been polymerised in an organic medium but may have been polymerised in aqueous dispersion in the presence of an emulsifying agent, for example by the processes described in U.K. Patent Specification 689,400 or 821,353. The polymer from such aqueous dispersion may be flushed into an organic medium by techniques disclosed in U.K. Specifications 696,321 and 1,064,840. The fluorocarbon polymers obtained via the aqueous polymerisation system may be of considerably higher molecular weight than those obtained from polymerisation in an organic medium and may be more suitable for use in combination with the binders herein described in applications where high temperatures are encountered.

In making compositions according to the invention, organosols of fluorocarbon polymers e.g. an organosol of PTFE made as above described or an organosol of polyvinylidene fluoride may have complex aluminium phosphates added to them either in powder form or as a solution in an organic solvent.

An important use of such compositions is as coatings. After application to a substrate the composition may be given a heat treatment to convert the complex aluminium phosphate to an aluminium phosphate providing a strongly adherent coating containing the fluorocarbon polymer on the substrate.

As the complex aluminium phosphate acts as a binder for fluorocarbon polymer it is only necessary to heat the coating to a temperature at which the complex aluminium phosphate is converted into the aluminium phosphate and so coatings can be applied to substrates that would not withstand temperatures of more than 80° C to 180° C.

The compositions based on organosols may be applied as coatings to a variety of substrates including glass, e.g. for use in non-stick ovenware and non-stick autoclave linings; and metals such as ferrous metals, for example cast iron, mild steel, stainless steel and aluminium and its alloys.

The compositions based on organosols are also suited to coating tools, such as saw blades, to give coated surfaces having a low coefficient of friction but having good abrasion resistance.

The substrates to which the organosol-based coating compositions are applied should be clean and free from grease and preferably are roughened, for example by abrading by grit blasting. Coatings may be applied by any of the conventional techniques including spraying, dipping or brushing.

The compositions based on organosols are also useful for impregnating a variety of materials such as glass cloth, porous metals, or other supporting substrates as described in U.K. Patent Specification 1,163,423. The impregnated article is given an appropriate heat treatment to convert the complex aluminium phosphate into the abrasion resistant aluminium phosphate. The heating conditions will be governed both by the choice of fluorocarbon used in the composition and by the material chosen for impregnation.

Optimum results are obtained in the coating and impregnation applications using compositions based on organosols when all the processes up to and including the curing of the complex aluminium phosphate are carried out under essentially anhydrous conditions.

PTFE-containing liquid compositions in which the liquid is either water or an organic liquid may be made by mixing a PTFE powder into the liquid to form a dispersion which is then blended with the binding means. Alternatively they may be made by mixing the PTFE directly into a liquid medium containing the binding means. The PTFE may be in the form of a lubricant grade powder. By the term lubricant grade PTFE powder we mean a PTFE powder of average particle size of less than 20 $\mu$m (as measured optically) that has been prepared by processes including comminution of a high molecular weight PTFE. Suitable materials have a melt viscosity at 380° C of less than $10^6$ Nsec/m$^2$ measured at a shear stress of $4 \times 10^4$ N/m$^2$.

Examples of commercially available dry lubricant powders are 'Fluon' L169 which has a melt viscosity at 380° C of the order of $4 \times 10^4$ Nsec/m$^2$ and an average particle size of the order of 5 $\mu$m ('Fluon' is a Registered Trade Mark of Imperial Chemical Industries Limited) and 'Fluon' L170 which is a friable PTFE powder of 4 $\mu$m median particle size which can be broken down to smaller particle size (as low as 0.1 $\mu$m) when processed in various media e.g. by a high shear mixer. Thus 'Fluon' L170 may be added to an aqueous or organic medium and broken down by use of a high shear mixer to produce a colloidal dispersion of the polymer in the medium in which the binder is already present or to which it is added subsequently.

Liquid compositions made by dispersing a solid form of fluorocarbon polymer in a liquid medium may be used as coatings. Where the binding means is in the form of an aluminium phosphate acid mixture as above described or a complex aluminium phosphate, strongly adherent coatings can be obtained on a variety of substrates. This property can be made use of by mixing a fluorocarbon polymer powder, particularly PTFE, with a solution of the complex aluminium phosphate, and applying the mixture to a substrate and heating whereupon, on conversion of the complex aluminium phosphate to the aluminium phosphate during the heating step, an adherent coating, containing the fluorocarbon polymer is formed on the substrate.

As the complex aluminium phosphate acts as a binder for the fluorocarbon polymer, no sintering step is essential and so coatings can be applied to substrates that would not withstand the normal fluorocarbon polymer sintering step.

A preferred PTFE powder for these coating compositions is a lubricant grade PTFE powder. It is also preferred that the complex aluminium phosphate of these compositions is in an organic solution. The coating compositions may be applied to a substrate by any of the conventional techniques such as spraying, dipping and brushing. The substrates to which the compositions are applied should be clean and free from grease and preferably are roughened, for example by abrading by grit blasting.

The compositions may be applied as coatings to a variety of substrates including glass and metals such as ferrous metals, aluminium and its alloys.

The compositions are particularly suited to coating cooking utensils, oven linings and the surfaces of tools such as saw blades where a surface having a low coefficient of friction but having good abrasion resistance is required.

Lubricant grade powders may also be dispersed to form pastes in water or organic media, and these, containing a complex phosphate as binding means may be spread by conventional techniques on substrates and then dried and baked.

Another application of mixtures of a fluorocarbon polymer powder and a solution in an organic medium is as follows. In making such a mixture, a lubricant grade of PTFE powder may for example be dispersed in a solution of the complex aluminium phosphate in an alcohol. Having obtained the mixture, it is heated to remove the solvent and to convert the complex aluminium phosphate to the aluminium phosphate. Alternatively a dry mix of lubricant grade powder and complex phosphate may be made and heated to convert the complex to aluminium phosphate. One use of this process is to prepare lubricating reinforcing fillers. Thus after conversion of the complex aluminium phosphate to an aluminium phosphate the mixture may be comminuted, for example by milling, to give a powder which can be incorporated as a reinforcing lubricating filler into thermoplastic or thermosetting resins for example polyamides; acetal resins; polycarbonates; polyolefins, particularly polyproplene; polyimides; phenol formaldehyde resins; polyesters; polyurethanes; rubbers and epoxy resins. Such thermoplastic or thermosetting resin compositions containing the reinforcing lubricating filler are of use in bearing applications. Typical resin compositions contain from 5-30% by weight of the reinforcing lubricating filler based on the weight of the resin.

In the manufacture of powder compositions according to the invention, a fluorocarbon polymer powder e.g. a PTFE moulding powder may be mixed with the complex aluminium phosphate powder. The compositions may be moulded by conventional PTFE moulding techniques, i.e. preforming followed by sintering, into articles which exhibit the low friction characteristics of PTFE but also have improved wear resistance donated by aluminium phosphate formed by decomposition of the complex aluminium phosphate during the sintering step. Because the complex aluminium phosphate can act as a binder, in some cases the conventional sintering step can be omitted, the mixtures merely being heated sufficiently to decompose the complex aluminium phosphate whereupon the PTFE becomes bound by the aluminium phosphate. For such applications the amount of complex aluminium phosphate used may be within the range 5 to 80% by weight of the PTFE.

Compositions moulded in this way are of particular utility for bearing applications.

Instead of mixing the complex aluminium phosphate with a fluorocarbon moulding powder, the complex aluminium phosphate may first be decomposed to form the aluminium phosphate (which may be in polymeric form) which is then ground to a suitably finely divided state prior to mixing with the fluorocarbon polymer powder. By this technique, the advantages of the use of the complex aluminium phosphate as a binder for the fluorocarbon polymer are lost but porosity in mouldings which might occur with the use of the complex aluminium phosphate because of the evolution of gaseous decomposition products during the heating step can be avoided. The aluminium phosphate can thus be used as a filler for the fluorocarbon polymer and thus the invention provides a composition containing a fluorocarbon polymer (e.g. PTFE) and aluminium phosphate in intimate admixture, the aluminium phosphate having been prepared preferably by heating a complex aluminium phosphate as previously described.

Instead of using PTFE moulding powders lubricant grade PTFE powders as previously mentioned may be employed. These lubricant grade powders may be mixed either with the complex aluminium phosphate powder or a powdered form of aluminium phosphate.

The various aspects of the invention will be illustrated by the following examples.

EXAMPLE 1

40 parts by weight of anhydrous aluminium chloride was added to 237 parts by weight of absolute ethyl alcohol. The resultant solution was cooled to 0° C and 32 parts by weight of 88% orthophosphoric acid was added to it in a drop-wise manner and the reaction mixture stirred. The reaction was carried out in an atmosphere of dry nitrogen. The white crystalline material formed was separated from the mixture, washed with ethanol and dried under vacuum at a temperature of 0° C. 70 parts by weight of product was obtained and gave the following analysis (expressed as a percentage by weight)

| Al | Cl | PO$_4$ | H$_2$O | EtOH |
|---|---|---|---|---|
| 6.7 | 10.8 | 22.6 | 1.9 | 56 |

Expressed as a molar ratio this material has an Al:Cl:PO$_4$ ratio of 1.00:1.22:0.96.

A sample (ca 1 kg) of this material was placed in a 15 cm diameter tube fitted with a No. G2 glass sinter near its base. Moist air was blown through the sample at ambient temperature for 42 hours.

A dry amorphous powder was formed which on analysis was found to be substantially free from ethyl alcohol giving the following analysis (expressed as a percentage by weight).

| Al | Cl | PO$_4$ | H$_2$O |
|---|---|---|---|
| 13.0 | 10.8 | 46.8 | 23.6 |

Expressed as a molar ratio this material has an Al:Cl:PO$_4$ ratio of 1.00:0.63:1.02.

30 grams of this powder, were added with stirring to 30 grams of distilled water. The mixture was left to stand for 15 hours and a further 65 grams of water were then added with stirring to give a clear solution. This solution was added with stirring to 125 grams of an aqueous PTFE dispersion containing 75 grams of PTFE of median particle diameter 0.13 μm and 1.84 grams of a non-ionic dispersion stabiliser consisting of a polyoxyethylated secondary decanol. The mixture thus contained 30% by weight of PTFE and 1.56% aluminium The quantity of complex aluminium phosphate present expressed as the weight of aluminium relative to the weight of PTFE was thus 5.2%.

The primer mixture thus prepared was sprayed onto a 10 cm × 10 cm plaque of plain aluminium (previously degreased with a dilute caustic soda solution) and the plaque heated in an oven at 150° C for approximately 10 minutes to give a dry adherent coating. The thickness of the coatings deposited was measured using a Permascope and found to be 6 μm. Adhesion was rated by the following three tests:

(1) By assessing qualitatively the ease of peeling off the coating with the thumbnail after penetrating the coating with a scalpel to expose the aluminium substrate.
(2) By cutting through the coating and into the metal with a razor blade to give a crosshatched pattern of cuts providing approximately 3 mm × 3 mm squares over an area of 625 mm². The adhesion of the coating is then assessed by firmly pressing a length of 25 mm wide, pressure-sensitive, adhesive tape over the cross-hatched area and subsequently pulling the tape sharply backwards at an angle of 45° to the direction of application. The application and stripping of tape over the cross-hatched area is repeated with fresh tape until there is evidence that the coating is detaching from the metal or, if no failure is observed, up to a maximum of 15 times.
(3) The cross-hatching procedure of test 2 was repeated and the test plaque was then immersed in a vegetable based cooking oil at 200° C for 8 hours. The adhesive tape test is carried out, after washing and drying the plaque up, to a maximum of 15 times.

The plaque coated with primer was tested for adhesion as described above. It was rated as excellent when assessed by test 1. No visible signs of adhesion failure were noted in either test 2 or test 3 after 15 attempts to remove the coating with adhesive tape.

A further aluminium plaque previously grit blasted with 60 mesh alumina was prepared having a primer coating as described above and, in addition after heating the primer coating at 150° C a conventional pigmented PTFE top coat, 'Fluon' Supercoat 3536-SC, was sprayed on. This was heated at 80° C for 10 minutes and then at 400° C for approximately 10 minutes to sinter the PTFE. The Permascope reading for the primer coating alone on grit-blasted aluminium was 13 μm. The instrument gave a reading of 27 μm for the final sintered primer plus top coat. The surface of the plaque was examined with a microscope and found to be substantially free from mudcracks, pitcracks, pinholes, blisters, contamination, discolouration, pigment agglomeration and roughness. Adhesion tests, as hereinbefore described, were carried out. The adhesion as assessed by test 1 was rated as excellent. The coating showed no sign of failure when tested according to tests 2 and 3.

EXAMPLE 2

The procedure of Example 1 was repeated except in that the phosphate containing material was omitted from the primer composition and was replaced by water to maintain the PTFE content of the primer at 30% by weight.

The primer composition was applied to a plain aluminium plaque and the coating dried using the conditions of Example 1. Adhesion was very poor.

A conventional pigmented PTFE top coat was applied to a grit-blasted aluminium plaque having a similar primer coat and this was dried and sintered as in Example 1. Although the coating when examined using a microscope appeared to have a satisfactory surface the coating could be easily peeled off by scratching with a thumbnail. The coating was also substantially removed from the cross-hatched area by the removal of the first application of pressure sensitive tape in the adhesion tests 2 and 3 described in Example 1.

EXAMPLE 3

The procedure of Example 1 was carried out using a PTFE dispersion having a median particle diameter of about 0.24 μm. The dispersion of PTFE contained 1.18 grams of the dispersion stabiliser used in Example 1. The adhesion of the primer coat on plain aluminium and of the primer plus the top coat on grit-blasted aluminium was as good as that of Example 1 as measured by all three adhesion tests described in Example 1.

EXAMPLE 4

In a control experiment the conditions of Example 3 were repeated but the complex aluminium phosphate was omitted. The control coatings of primer on plain aluminium and of primer plus top coat on grit-blasted aluminium showed very poor adhesion. The coating of primer plus top coat was substantially completely removed by the removal of the first strip of adhesive tape in adhesion tests 2 and 3 described in Example 1.

EXAMPLE 5

A further sample of an ethanol-containing complex aluminium phosphate was made according to the method of Example 1 and was found to have the following analysis, (expressed as a percentage by weight).

| Al | Cl | PO$_4$ | EtOH |
|---|---|---|---|
| 7.1 | 10.2 | 24.5 | 55.0 |

Expressed as a molar ratio this material has an Al:Cl:PO$_4$ ratio of 1.00:1.09:0.94.

The sample was dissolved to give a 50% w/w solution in methanol.

The procedure of Example 1 was then repeated except in that the quantity of complex aluminium phosphate added, by weight of the PTFE, was 2.1% expressed as the weight of the aluminium, the water content of the dispersion being adjusted to give a dispersion containing 30% PTFE by weight. The aluminium content, expressed relative to the total weight of primer, was 0.63%. Primer and top coats were applied as described in Example 1. The adhesion of the coatings was equivalent to those of Example 1.

A similar experiment was carried out using an aqueous solution of a complex aluminium phosphate having the analysis (expressed as a percentage by weight)

| Al | Cl | PO$_4$ | EtOH | H$_2$O |
|---|---|---|---|---|
| 5.8 | 8.7 | 19.3 | 44.1 | 16.8 |

Expressed as a molar ratio the Al:Cl:PO$_4$ ratio is 1.00:1.14:0.94. The final primer contained 2.3% aluminium relative to PTFE (0.69% aluminium relative to weight of primer). Excellent results were obtained.

EXAMPLE 6

The procedure of Example 1 was repeated using an aqueous solution of the complex organic phosphate used in the second experiment of Example 5, that is to say, the complex phosphate having an Al:Cl:PO$_4$ molar ratio of 1.00:1.14:0.94. The final primer contained a concentration of 4.7% aluminium by weight relative to PTFE (1.41% aluminium relative to final primer). The adhesion results obtained were as good as those obtained in Example 1.

A further mixture was made which differed from the former in that 14 grams of 88% orthophosphoric acid was added in place of 14 grams of water. This meant that the added acid was in the proportions of approximately one mole of H$_3$PO$_4$ for every mole of AlPO$_4$ already in the complex. The adhesion obtained was noticeably poorer. The grit-blasted aluminium plaque coated with this primer and a top coat of pigmented PTFE (as used in earlier examples) showed slight discoloration and withstood only two strippings of adhesive tape after being heated in oil as in test No. 3.

EXAMPLE 7

The procedure of Example 3 was repeated using an aqueous solution of the complex phosphate used in Examples 5 and 6, the final primer containing 4.7% aluminium relative to PTFE (1.41% aluminium relative to the final primer). Excellent adhesion results were obtained for both the primer on plain aluminium and primer plus top coat on grit-blasted aluminium plaques.

In a further mixture of the type described above (but now containing ca 4.3% aluminium relative to PTFE) the amount of the dispersion stabiliser (as specified in Example 1) in the PTFE dispersion was increased by 3.32 grams to give a total of 4.5 grams (i.e. 6% by weight relative to the PTFE), the PTFE content of the primer mixture being maintained at 30% by weight by adjusting the amount of water added. The mixture was sprayed onto grit-blasted aluminium plaques and after heating at 150° C was subsequently top coated with the conventional pigmented PTFE dispersion used in Example 1. After drying and sintering the coating was tested for adhesion according to methods 1, 2 and 3 of Example 1. In test number 3, the coating in the cross-hatched area showed signs of deterioration after 8 pieces of adhesive tape had been successively stripped off.

EXAMPLE 8

A complex aluminium phosphate powder of the type used in Example 1 (the molar ratios of Al:Cl:PO$_4$ being 1:0.63:1.02) was dissolved in water, and concentrated hydrochloric acid added to change the molar ratios to 1:1.47:1.02. This solution was then incorporated into a PTFE dispersion similar to that used in Example 1 (but now stabilised with the non-ionic surfactant described in Example 1 at a level of 2% by weight relative to PTFE) and sufficient water added to give a final primer composition containing 30% by weight of PTFE, with phosphate (expressed as $PO_4$) to PTFE weight ratio at 0.19:1. The aluminium content relative to PTFE, was 5.31% or, 1.59% based on the total weight of primer. The primer mixture was sprayed onto grit-blasted aluminium, heated at 150° C, and then sprayed with PTFE top coat (as used in Example 1) dried and then sintered at 400° C. Subsequent adhesion tests showed results as good as those of Example 1.

EXAMPLE 9

The procedure of Example 8 was repeated except that extra $H_3PO_4$ was added to the complex phosphate solution (instead of HCl) to change the Al:Cl:$PO_4$ atomic ratios from 1:0.63:1.02 to 1:0.63:1.88. The primer mixture made up contained 30% PTFE with the phosphate (expressed as $PO_4$) to PTFE weight ratio at 0.34:1. The aluminium content was 5.2% relative to PTFE or 1.56% based on the total weight of primer. The primer was tested on grit-blasted aluminium with subsequent top coat as before. Excellent results were obtained from tests 1 and 2, with a marginal deterioration i.e. beginning of adhesion failure on the 15th adhesive tape stripping in test 3.

EXAMPLES 10 to 14

In these examples the complex aluminium phosphate used was the same as that used in Example 1 and the PTFE dispersion was of a similar type except in that it contained 2% by weight of the dispersion stabiliser relative to polymer. The primers were arranged to have different levels of PTFE and different $AlPO_4$/PTFE ratios as shown below. The percentages of aluminium by weight relative to the PTFE content and to the total weight of primer are also recorded.

| Example | % PTFE in final primer | $AlPO_4$/PTFE weight ratios | Al/PTFE % by wt. | Al/primer % by wt. |
|---|---|---|---|---|
| 10 | 20.3 | 0.96 | 21.1 | 4.30 |
| 11 | 26.9 | 0.60 | 13.2 | 3.56 |
| 12 | 30.0 | 0.48 | 10.6 | 3.18 |
| 13 | 10.0 | 0.24 | 5.3 | 0.53 |
| 14 | 47.3 | 0.12 | 2.65 | 1.25 |

The primers were tested using grit-blasted aluminium as substrate as hereinbefore described. Results were rated excellent for tests 1 and 2 each time. In the case of test 3 primer mixture Example 14 showed evidence of marginal failure at the 14th tape pull presumably because of the low binder/PTFE ratio. The other mixtures showed good results for test 3.

EXAMPLES 15 to 19

In these examples the primers all contained Al, Cl and $PO_4$ but in different molar proportions. The primers were all made by adding the particular Al/Cl/$PO_4$ aqueous solution to stabilised PTFE dispersion (of the type used in Examples 10 – 14). The final PTFE contents were 30% each time (except in Example 15 where it was 29%) and the phosphate (expressed as $PO_4$) to PTFE weight ratio was 0.16:1 each time. The methods of preparation of the binder and the Al:Cl:$PO_4$ ratios of each binder were as follows:

| Example | Al:Cl:$PO_4$ (molar ratios from analysis) | Note on preparation of solution |
|---|---|---|
| 15 | 1:2.58:0.53 | Add $H_3PO_4$ to solution of $AlCl_3$ in water. (Molar proportions $AlCl_3$:$H_3PO_4$ ca 2:1) |
| 16 | 1:0.66:1.53 | Add $H_3PO_4$ solution to aqueous solution of complex aluminium chlorophosphate hydrate of similar type to that used in Example 1. |
| 17 | 1:1.50:1.03 | Add HCl solution to aqueous solution of powder of similar type used in Example 21. |
| 18 | 1:0.88:1.00 | Use aqueous solution of a complex aluminium phosphate of similar type to that used in Example 21. |
| 19 | 1:0.66:0.99 | Use of complex aluminium phosphate of similar type to that of Example 1. |

The aluminium contents relative to PTFE and expressed on final weight of the primer composition were as follows:

| Example | Al/PTFE % by weight | Al/primer % by weight |
|---|---|---|
| 15 | 8.62 | 2.5 |
| 16 | 2.97 | 0.89 |
| 17 | 4.40 | 1.32 |
| 18 | 4.54 | 1.36 |
| 19 | 4.60 | 1.38 |

The primers were tested on grit blasted aluminium with top coat as before. Results from tests 1 and 2 were very good each time. In test 3, primer Example 19 began to show top coat adhesion failure at the 13th stripping, primer 16 at the 14th stripping, but all the others were still satisfactory at the 15th stripping. Final coating derived from primer 15 showed some discoloration and surface imperfections, presumably due to the high level of HCl. Primer mix 17 (see also Example 8) with Al:Cl at 1:1.5 did not show this defect.

EXAMPLE 20

A primer composition was made similar to that of Example 1 in all respects except in that a non-ionic surfactant consisting of a polyoxyethylated octyl phenol was used to stabilise the PTFE dispersion (at a level of 2.3% by weight relative to PTFE) instead of the surfactant used in Example 1. The PTFE dispersion feedstock ex autoclave showed a median particle size of 0.15 $\mu$m. The primer contained 1.56% by weight of aluminium, equivalent to 5.2% aluminium relative to the weight of PTFE. The primer appeared satisfactory on the basis of spraying and subsequent adhesion tests described in Example 1 using grit-blasted aluminium as substrate and top coat as hereinbefore described.

EXAMPLE 21

100 g of powdered aluminium orthophosphate trihydrate were placed in a cylindrical glass vessel equipped at its base with an inlet tube through which a dry mixture of nitrogen and 10% by volume of hydrochloric acid gas was passed out at a rate of 200 liters per hour. The reaction mass was stirred by means of a paddle stirrer rotating coaxially in the glass vessel. The temperature of the reaction mass was maintained at 35° to 40° C. Waste gases were vented to atmosphere. After 1 hour of reaction time, a white product solid was removed from the vessel and analysed.

The material had an approximate formula $AlPO_4.3H_2O.HCl$ (analysing as 12.2% Al, 16.5% Cl, 43.7% $PO_4$, 23.6% $H_2O$). The powder was dissolved in water and added to a PTFE dispersion having a particle size of 0.15 μm ex autoclave and being stabilised with 2.5% by weight of a polyoxyethylated secondary alcohol based on the weight of PTFE so that the final composition was 25% by weight PTFE with $AlPO_4$:PTFE weight ratio at 0.19:1. This corresponds to an aluminium content of 4.20% by weight of PTFE or 1.05% by weight of the primer composition. The primer gave excellent results on the basis of spraying and subsequent adhesion tests, using grit-blasted aluminium as substrate and top coat as described in Example 1.

EXAMPLE 22

A primer was made using the $AlPO_4.3H_2O.HCl$ described in Example 21. This was incorporated into a PTFE dispersion stabilised as described in Example 20 so that the final PTFE content was 35% and the $AlPO_4$:PTFE weight ratio was 0.19:1. This corresponds to an aluminium content of 4.2% by weight of PTFE or 1.47% by weight of primer. The primer was rated as excellent on the basis of tests described in Example 1.

EXAMPLE 23

A mild steel plaque was grit-blasted with alumina, heated to 400° C, cooled and then coated with the primer described in Example 1. It was then heated to 150° C, cooled and coated with conventional PTFE top coat (pigmented but not containing any phosphates) of the type used for the previous examples, dried and then sintered at 400° C. Subsequent adhesion tests and surface quality examinations showed excellent results.

EXAMPLE 24

2.5 grams of the non-ionic surfactant used in Example 1 was mixed with 200.3 grams of water and to this was added 100 grams of a dry lubricant grade of PTFE powder known as 'Fluon' L170. (The median particle size of this powder was about 4 μm (optical method)).

The mixture was stirred in a Silverson Heavy Duty laboratory mixer Emulsifier Type L2R using a head with holes having a diameter of 1/32 inches for 10 minutes, and later, just before adding the complex phosphate solution described below, for a further two minutes.

40 grams of water were added to 40 grams of a complex aluminium phosphate powder of the type described in Example 1. The mixture was stirred and then kept at 50° C for 2 hours to aid solution. 17.2 grams of water were then added and the mixture blended with the PTFE dispersion described above. The aluminium content was 5.2% by weight of PTFE or 1.3% by weight of the primer. The primer mixture, which showed a tendency for the PTFE to settle out, was agitated before spraying on grit blasted aluminium. Primer baking and subsequent top coat application were as before. Tests 1, 2 and 3 described earlier showed excellent results each time.

EXAMPLE 25

A composition was prepared by mixing 18 cm³ of a 25% by weight solution of aluminium chlorophosphate ethanolate of a similar type to that described in Example 1 in isopropyl alcohol with 9 g of a polytetrafluoroethylene telomer dispersed in 25 cm³ of trifluorotrichloroethane.

An aluminium panel was grit blasted with 60 mesh aluminium grit and sprayed with the above composition. After initial heating at 60° C for two hours, the panel was further heated at 310° C for five minutes.

The coated panel was further sprayed with an aqueous dispersion of polytetrafluoroethylene and dried. The resultant coating was sintered at 380° C to provide an adherent coating.

EXAMPLE 26

A composition was prepared by mixing 18 cm³ of a 25% by weight solution in isopropyl alcohol of the aluminium chlorophosphate ethanolate used in Example 25 with 150 cm³ of a 40% by weight dispersion of polyvinylidene fluoride sold under the name "Kynar" 500. This composition was sprayed onto an aluminium plaque which had previously been grit-blasted with 60 mesh alumina. The coating was dried for 2 hours at 60° C and then at 160° C for 10 minutes. The coating was finally heated at 250° C for 10 minutes to provide an adherent coating.

EXAMPLE 27

9 parts of an ethanol-containing complex aluminium phosphate of the type described in Example 1 were dissolved in a mixture comprising 66.7 parts of methanol and 33.3 parts of chloroform. To this was added 50 parts of a fluorocarbon dry lubricant powder known as 'Fluon' L169 having a mean particle size of 5 μm. The powder was dispersed in the organic phase by vigorous mechanical stirring and the composition was subsequently sprayed onto a glass surface previously degreased with chloroform. The coating was dried at 120° for 10 minutes. Three further coatings were applied with the same drying procedure after each coat to give a coating having a total thickness of about 3 μm. The adhesion of the composite coat was tested by attempting to remove the coating from the glass with the thumbnail. The adhesion was rated as excellent. Similar results were obtained when the composition was coated in an identical manner on to plain aluminium and aluminium roughened by grit-blasting with alumina.

EXAMPLE 28

A coating composition was prepared as in Example 27 and two coats were applied to a glass substrate, the coats being dried at 120° C for 10 minutes after each application. The thickness of the coating at this stage was about 15 μm. A coating of a PTFE aqueous dispersion known as 'Fluon' GP1 was sprayed onto the coated surface. The coating was dried at 150° C for 10 minutes and was subsequently heated to 380° C for 10 minutes to sinter the PTFE. The thickness of the PTFE top coat was about 5 μm. The adhesion of the coating was assessed by the method of Example 1 and was rated as good. Similar results were obtained on plain aluminium and grit-blasted aluminium.

EXAMPLE 29

A composition was prepared similar to that of Example 27 except in that 60 parts of 'Fluon' L169 were added. A coating was applied in four parts following the method of Example 1 on to substrates consisting of glass, plain aluminium and grit-blased aluminium. Coatings were obtained which had excellent adhesion as rated by the thumbnail test of Example 1.

EXAMPLE 30

The procedure of Example 27 was repeated using the coating composition used in Example 30. Coatings on glass, plain aluminium and grit-blased aluminium were rated as excellent as assessed by the thumbnail test.

EXAMPLE 31

30 g of an ethanol containing complex aluminium phosphate similar to the type described in Example 1 was dissolved in 170 cm$^3$ of dry methanol. 4.5 g of 'Fluon' L169 was added to this mixture and was intimately dispersed by vigorous mechanical stirring. The composition was sprayed onto plaques of aluminium roughed by grit-blasting with alumina. The coating was dried at 150° C for 15 minutes. The adhesion of the coating to the aluminium was tested by attempting to remove the coating from the aluminium with the thumbnail. The adhesion was rated as excellent.

EXAMPLE 32

The procedure of Example 31 was repeated using 'Fluon' L170 in place of 'Fluon' L169. The cured coating composition was found to have excellent adhesion to the aluminium.

EXAMPLE 33

The procedure of Example 32 was repeated except that the quantity of 'Fluon' L170 was increased to 15 g. The adhesion of the cured coating to the aluminium was rated as excellent.

EXAMPLE 34

100 grams of aluminium orthophosphate hydrate (analysing as $AlPO_4.2.7H_2O$) was dissolved in 104.5 grams of a hydrochloric acid solution containing 23.5 grams HCl. The mixture (hereinafter called solution A) was kept at 48° C for 6 hours to assist solution of the phosphate. To 15.7 grams of solution A a further 83.1 grams of water was added and the mixture blended with 101.2 grams of an aqueous PTFE dispersion containing 59.5% w/w of PTFE stabilised with 2.3% w/w (based on the PTFE) of a non-ionic surfactant consisting of an alkyl phenol ethoxylate. The PTFE dispersion was slightly acidic (pH ca 3) and the median primary particle size therein was ca 0.15 μm. The composition of the final mixture (the primer) was: 30.0% PTFE, 0.7% non-ionic surfactant, 3.8% aluminium orthophosphate hydrate, 0.9% HCl and 64.6% water, all percentages being by weight. In terms of $AlPO_4$, there was 9.1% w/w relative to the PTFE, and the $Al:Cl:PO_4$ molar ratio was 1:1.09:1. In terms of aluminium there was 2.0% w/w relative to PTFE or 0.60% w/w relative to the primer composition.

The primer mixture thus prepared was sprayed on to a 10 cm × 10 cm plaque of aluminium previously grit-blased with 60 mesh alumina and the plaque heated in an oven at 150° C for approximately 10 minutes. A conventional pigmented PTFE top coat (not containing any phosphate or HCl) was then sprayed on to the plaque which was then heated at 80° C for 5 minutes and then at 400° C for approximately 10 minutes to sinter the PTFE. According to Permascope readings the difference between primer plus top coat reading and uncoated substrate reading was 19 μm. The surface of the plaque was examined with a microscope and found to be substantially free from mudcracks, pitcracks, pinholes, blisters, contamination discoloration, pigment agglomeration and roughness.

The adhesion of the coating on the plaque described above was rated excellent when assessed by test 1 described in Example 1, and no visible signs of adhesion failure of the coating were noted in either test 2 or test 3 (described in Example 1) after 15 attempts to remove the coating with adhesive tape.

EXAMPLE 35

To 46.8 grams of solution A (described in Example 34) a further 46.5 grams of water was added and the mixture blended with 106.7 grams of an aqueous PTFE dispersion containing 56.3% w/w PTFE stabilised with 2.5% w/w of the non-ionic surfactant used in Example 1. The PTFE dispersion was slightly acidic (as in Example 34) and the primary particle size was ca 0.15 μm. The composition of the final mixture was thus 30.0% PTFE, 0.8% non-ionic surfactant 11.4% aluminium orthophosphate hydrate, 2.7% HCl and 55.1% water, all percentages being by weight. In terms of $AlPO_4$ there was 27.4% by weight relative to the PTFE and the $Al:Cl:PO_4$ molar ratio was 1:1.09:1. In terms of aluminium there was 4.57% relative to the PTFE or 1.37% relative to the total weight of primer.

The primer mixture was sprayed on to a grit blasted aluminium plaque which was then heated at 150° C for approximately 10 minutes. A top coat was then applied (similar to that of Example 34). After sintering the total coating gave a reading of 30 μm on a Permascope, the gritted aluminium without any coating giving a reading of 15 μm.

The adhesion tests described in Example 1 were carried out and results were equivalent to those found for the plaque of Example 1.

EXAMPLE 36

100 grams of a commercial aluminium orthophosphate trihydrate essentially $AlPO_4.3H_2O$ was dissolved in 81 grams of a hydrochloric acid solution containing 20.9 grams of HCl. The mixture was kept at 48° C for 5 hours to assist solution of the phosphate, and then diluted by adding 20.4 grams of water. 4 grams of the diluted phosphate solution was blended with 156 grams of an aqueous PTFE dispersion containing 32.4% w/w PTFE, (median particle size ca 0.14 μm) stabilised with 2.5% w/w (based on the PTFE) of the non-ionic surfactant used in Example 1. The PTFE dispersion was slightly acidic and the particle size therein was ca 0.1 μm.

The composition of the final mixture was: 25.3% PTFE, 0.6% non-ionic surfactant, 10.9% aluminium orthophosphate hydrate, 2.3% HCl and 60.9% water, all percentages being by weight. There was thus 30% w/w $AlPO_4$ relative to the PTFE, and the $Al:Cl:PO_4$ molar ratio was 1:1:1. In terms of aluminium there was 6.63% relative to the weight of PTFE or 1.69% relative to the weight of primer.

This primer mixture was then tested on grit-blasted aluminium in a way similar to that described in Example 1. Adhesion of the final coating (based on the three tests described earlier) was equivalent to that of Example 1.

EXAMPLE 37

2.8 grams of analytical grade 36% w/w hydrochloric acid was mixed with 15.9 grams of water, and to this was added 19.5 grams of $AlPO_4 3H_2O$ with stirring. The mixture was heated to 52° C, held there for 3 hours then left to cool. The product was almost solid, but on breaking it up with a spatula and stirring, it became more fluid. In this fluid state it was added to 141.8 grams of a PTFE dispersion containing 45 grams of PTFE stabilised with 1.1 grams of the non-ionic surfactant used in Example 1 (i.e. ca 2.5% w/w relative to the PTFE) and the mixture stirred and finally filtered to remove any traces of undissolved phosphate.

The primer thus contained 25% w/w PTFE. The aluminium phosphate (expressed as $AlPO_4$) was ca 30% w/w relative to the PTFE and the $Al:Cl:PO_4$ molar ratio was 1:0.25:1. The aluminium content was 6.65% relative to the weight of PTFE or 1.66% relative to the weight of primer.

The primer was then tested as described in earlier examples i.e. it was sprayed on to an alumina gritted aluminium plaque, heated at 150° C and then sprayed with conventional PTFE top coat (as used before) dried and sintered. Adhesion of the final coating based on the three tests described earlier was equivalent to that of Example 1.

EXAMPLE 38

29.7 grams of $AlCl_3 6H_2O$ crystals were dissolved in 70.4 grams water and to this was added 13.7 grams of 88% w/w orthophosphoric acid. The mixture was added to 86.2 grams of a PTFE dispersion (particle size ca 0.13 μm) containing 58% w/w PTFE and stabilised with 2% w/w, relative to PTFE, of the non-ionic surfactant used in Example 1. The primer so obtained thus contained 25% w/w PTFE with 'in situ' $AlPO_4$ equivalent to 30% by weight of the PTFE (the $AlCl_3:H_3PO_4$ molar ratio being 1:1. The aluminium content relative to the weight of PTFE was 6.65% or 1.66% relative to the weight of primer. The primer was sprayed on to grit-blasted aluminium, baked at 150° C and then coated with conventional pigmented PTFE top coat as in previous examples and sintered at 400° C. Adhesion was excellent as judged by tests described earlier. However some evidence of surface imperfection was noted (attributed to the relatively large amount of HCl in the primer).

EXAMPLE 39

21.6 grams of $AlPO_4 3H_2O$ powder was added with stirring to a mixture of 11.3 grams of concentrated nitric acid (containing 68% w/w $HNO_3$) and 80.9 grams of water. The mixture was heated at 50° C for 2 hours during which virtually all the powder dissolved. The mixture was added to 86.2 grams of PTFE dispersion of the type used in Example 38. The primer so obtained thus contained 25% w/w PTFE with the $AlPO_4:HNO_3$ molar ratio at 1:1 and with 30% by weight $AlPO_4$ relative to PTFE. The aluminium content was 6.65% relative to the weight of PTFE or 1.66% relative to the weight of primer. The primer was tested as in previous examples, the primer being sprayed on to grit blasted aluminium, baked at 150° C, and a conventional pigmented PTFE top coat applied as in Example 1. Excellent results for tests 1, 2 and 3 (described in Example 1) were found.

EXAMPLE 40

10.8 grams of $AlPO_4.3H_2O$ were added to 103 grams of a dilute aqueous sulphuric acid containing 6 g of $H_2SO_4$, and left to stand for 17 hours. The resulting clear solution was then added with stirring to 86.2 grams of a PTFE dispersion containing 58% w/w PTFE and stabilised with 2% by weight (relative to PTFE) of the non-ionic surfactant used in Example 1. The resulting primer mixture thus contained 25% w/w PTFE, 7.5 grams $AlPO_4$ (30% relative to PTFE) and 1 mole $H_2SO_4$ per mole of $AlPO_4$. In terms of aluminium it contained 6.65% relative to PTFE or 1.66% relative to the weight of primer. This primer was tested by spraying on to grit-blasted aluminium, baking at 250° C and then applying a conventional top coat of pigmented PTFE (as used in other examples) and finally sintered at 400° C. Excellent results were found for the adhesion as assessed by tests 1, 2 and 3 described in Example 1 and the surface appearance was rated as good.

EXAMPLE 41

By adding $AlPO_4 3H_2O$ dissolved in concentrated hydrochloric acid to a PTFE dispersion similar to that used in Examples 36 and 37 stabilised with the non-ionic surfactant used in Example 1, a primer was made up having the following composition: 25% w/w PTFE, 2.5% w/w non-ionic surfactant relative to PTFE, 30% by weight $AlPO_4$ relative to PTFE and $AlPO_4:HCl$ in molar ratios of 1:1 (i.e. similar to Example 36). In terms of aluminium the primer contained 6.65% relative to the weight of PTFE or 1.66% relative to the weight of primer. This primer was tested on two different substrates namely (a) a mild steel plaque, grit-blasted with alumina and then heated to 400° C and cooled prior to coating (b) an aluminium plaque coated with a frit known as Ferro CN500TX2. The primer coat was each time baked at 150° C before applying the conventional pigmented top coat (not containing any acidic phosphates) and tested as before. Results were very satisfactory.

EXAMPLE 42

The primer described in Example 41 was pigmented by adding 1 part by weight of pigment paste to 99 parts by weight of primer. The pigment paste consisted of carbon black (25%) suspended in water and stabilised with a polyoxyethylated long chain alcohol. The pigmented primer was applied as usual, baked at 150° C and then covered with top coat as described before. Subsequent surface appearance was excellent and adhesion tests gave excellent results.

EXAMPLE 43

19.0 grams of 68% w/w nitric acid were mixed with 76.6 grams of water and to this was added 18.0 grams of $AlPO_4.3H_2O$ powder with stirring. The mixture was kept at 50° C for 2 hours to aid solution. This was then added with stirring to 86.4 grams of PTFE aqueous dispersion containing 57.9% w/w PTFE, stabilised with 2.0 w/w relative to PTFE of the non-ionic surfactant used in Example 1. This primer contained 25% w/w PTFE and had 25% w/w $AlPO_4$ relative to PTFE. The $AlPO_4:HNO_3$ molar ratio was 1:2. The aluminium content was 5.52% relative to the weight of PTFE or 1.38% relative to the weight of primer. The primer was tested as in previous examples and showed excellent adhesion before and after the hot oil treatment.

EXAMPLE 44

59.8 grams of concentrated hydrochloric acid (SG 1.18, 36% w/w HCl) were added to 10.6 grams water and to this was added 26 g of $AlPO_4 3H_2O$ powder. The mixture was warmed and kept at 50° C for 2 hours. The mixture was a pale yellow colour. This was added to 103.6 grams of PTFE dispersion of the type described in Example 43, and the final mixture (the primer) filtered through a No. 31 Whatman filter paper to remove a trace of undissolved $AlPO_4$. The primer thus contained 30% PTFE, 30% $ALPO_4$ relative to PTFE and the $AlPO_4$:HCl molar ratio was 1:4. The aluminium content was 6.64% relative to the weight of PTFE or 1.99% relative to the weight of primer. The primer was then tested as in previous examples, and showed excellent adhesion before and after hot oil treatment. Some brown spots were however noted in the coating.

EXAMPLE 45

21.6 g of $AlPO_4 3H_2O$ was dissolved in a solution of 12.5 g of 36% hydrochloric acid and 16.0 g water. To this was added 11 g of 88% $H_3PO_4$ and the mixture kept at 50° C for 2 hours. On cooling this was added to 138.9 g of a PTFE dispersion containing 36% by weight PTFE, stabilised with 2.5% of the non-ionic surfactant used in Example 1, relative to PTFE. The mixture (the primer) thus had 25% by weight PTFE and the A:Cl:$PO_4$ molar ratios were 1:1:1.8. The aluminium content was 6.6% by weight of the PTFE or 1.65% by weight of the primer. The primer was tested on grit-blasted aluminium, with top coat as before. The three adhesion tests described earlier all gave excellent results.

EXAMPLE 46

106 g of a sample of a commercially available aluminium hydroxy chloride (also known as aluminium chlorohydrate) with a formula $Al_2(OH)_5Cl.2.4H_2O$ based on the quoted analysis was added with agitation to 106 g of water. 53.5 g of a 36% w/w solution of hydrochloric acid was then added slowly with agitation. A clear solution was obtained and the temperature of the liquid rose from 12° C to 20° C over the period of addition of the hydrochloric acid. 115 g of 85% w/w orthophosphoric acid was then added slowly. An exothermic reaction ensued and the viscosity of the liquid mixture increased. External cooling was applied to keep the temperature of the mixture below 70° C. The mixture was cooled to between 30° C and 40° C and was then added to 1400 g of an aqueous dispersion of PTFE containing 29% w/w of PTFE which had been stabilised by the addition of 30.3 g of a 33% solution of the polyoxyethylated alcohol used in Example 1. The mixture was stirred gently for several hours to ensure that a homogeneous mixture was obtained.

The resulting primer mixture having a PTFE content of 22.6%, an Al:Cl:$PO_4$ molar ratio of 1:1:1 a polymer to $AlPO_4$.HCl ratio of 2.57/1 and an aluminium content of 1.49% based on the total weight of primer (6.65% aluminium based on the weight of PTFE) was sprayed on to a series of aluminium plaques which had previously been grit blasted and cleaned. The primer coating was baked at 150° C for 15 minutes. The primer-coated plaque was then sprayed with a conventional pigmented top-coat PTFE dispersion. The resulting coating was sintered at 390° C for 20 minutes. The coated plaques were allowed to cool to room temperature and were then subjected to a series of tests to assess the strength of the adhesion of the coating to the substrate both before and after immersion in Wesson oil at 205° C for 4 hours. After this treatment the test panels were allowed to cool to room temperature and were then washed with a detergent solution to remove the oil and dried.

The adhesion tests used before and after the hot oil treatment were as follows:

(1) The coating was scratched in a single scribe stroke through to the metal substrate. A fingernail was then applied at 90° to the scratch in an attempt to remove the coating by peeling. The result is quoted as the distance of peel in inches effected by this procedure.

(2) A cross-hatched pattern of cuts providing approximately 2.5 mm × 2.5 mm squares was produced in the test plaques by scribe cutting the coating through to the metal. A piece of 25 mm wide pressure sensitive, adhesive tape was firmly applied over the cross-hatched area and was then rapidly pulled sharply backwards at an angle of about 45° to the direction of application. Removal of coating in this test is considered a 'fail' whilst a coating left intact is rated as a 'pass'.

(3) In a similar test the coating on the plaque is cross-hatched with a scribe to provide a 1.5 mm × 1.5 mm pattern of squares over an area of about 625 $mm^2$. Pressure sensitive adhesive tape is firmly applied over the cross-hatched area and was then pulled sharply backwards at an angle of 45° to the direction of application. Up to 15 fresh pieces of tape are applied successively in this test and the approximate percentage of surface coating removed after 15 pulls is recorded. For example, if 100% removal after 12 pulls is obtained the result is expressed at 100/12.

(4) In a test to assess the hardness and adhesive cohesive strength of the coatings a Scratchmaster air stylus with a standard medium ball-point tip is attached to the air piston of area 320 $mm^2$ and applied to the coating. The gauge air pressure required to penetrate the coating to the substrate and scrape it away uniformly was measured in pounds per square inch (Gauge) (lbs/$in^2$ (Gauge)).

The results of this example are shown in the accompanying Table.

EXAMPLE 47

In this comparative example, the primer was omitted and the top coat formulation used in Example 46 was sprayed directly on to the grit blasted aluminium. Thereafter the coating was subjected to the same sintering and test procedures as described for the combined primer and top coat system. The results are shown in the Table.

EXAMPLE 48

In this Example which is also comparative, grit-blasted aluminium was coated with a commercially available chromate free primer system which was dried and subsequently coated with a top coat and sintered as described in Example 46. The results are shown in the Table.

Referring to the Table, there are listed against each example so far described and against further examples described subsequently, the total coating thickness, and the results obtained from the various tests described in Example 46. The fingernail scratch test is Test 1 described in Example 46 the crosshatch with 1 tape pull and the crosshatch with 15 tape pulls are Tests 2 and 3 in Example 46 and the Scratchmaster test is Test 4 in Example 46.

It will be seen that a significantly longer scratch both before and after treatment with oil were obtained when no primer was used compared with when primer according to the invention was used. The crosshatch with 1 tape pulled test shows that the coating without primer and the coating with the chrome free primer both failed whereas the coating according to the invention passed. In the case of the crosshatch with 15 pulls 100% of the coating was removed after 2 pulls and 6 pulls respectively in the case of Examples 47 and 48 whereas none of the coating of Example 46 was removed.

Further examples of compositions according to the invention are as follows.

EXAMPLE 49

Example 46 was repeated but using 674 g of a 60% PTFE dispersion stabilised with a modified ethoxylated octyl phenol to yield a dispersion containing 38% by weight of polymer with the same polymer to AlPO$_4$.HCl ratio as Example 46 and an aluminum content of 2.52% based on the total weight of primer. The results obtained by coating an aluminium substrate in a similar way to that described in Example 46 are given in the Table.

Al:Cl:PO$_4$ ratio to 1:1:2. Good results were achieved as shown in the Table.

EXAMPLE 54

Example 46 was repeated but the polymer addition was increased to 1350 g of 60% w/w dispersion to yield a final dispersion containing 46% by weight PTFE solids and a ratio of 5 to 1 of polymer to binder reckoned as AlPO$_4$.HCl. The primer dispersion thus contained 1.56% aluminum. Good results were achieved as shown in the Table.

EXAMPLE 55

Example 46 was repeated except that the addition of hydrochloric acid was reduced to 26.7 g to reduce the molar ratio of Al:Cl:PO$_4$ from 1:1:1 to 1:0.75:1.

EXAMPLE 56

Example 46 was repeated except that the hydrochloric acid addition was increased to 107 g to increase the molar ratio of Al:Cl:PO$_4$ to 1:1.5:1. Good results were achieved as shown in the Table.

| Example No. | Total Coating Thickness Mils | Fingernail Scratch Length (ins.) Initial | Fingernail Scratch Length (ins.) After Oil | Crosshatch with 1 Tape Pull Initial | Crosshatch with 1 Tape Pull After Oil | Scratchmaster lbs/in$^2$ (Gauge) Initial | Scratchmaster lbs/in$^2$ (Gauge) After Oil | Crosshatch with 15 Tape Pulls (% Pulls) Initial | Crosshatch with 15 Tape Pulls (% Pulls) After Oil |
|---|---|---|---|---|---|---|---|---|---|
| 46 | 1.15 | 0.25 | 1.00 | Pass | Pass | 7.0 | 7.0 | 0/15 | 0/15 |
| 47 | 1.00 | >1.00 | 3.00 | Fail | Fail | 7.0 | 5.0 | 100/5 | 100/2 |
| 48 | 1.6 | <0.25 | <0.75 | Fail | Fail | 7.0 | 7.0 | 100/6 | 100/6 |
| 49 | 1.30 | 0 | <0.25 | Pass | Pass | 9.0 | 6.0 | 0/15 | 0/15 |
| 50 | 1.05 | <0.25 | 0.50 | Pass | Pass | 7.0 | 5.0 | 0/15 | 25/15 |
| 51 | 1.05 | 0 | <0.25 | Pass | Pass | 7.0 | 5.0 | 0/15 | 0/15 |
| 52 | 0.95 | <0.25 | 0.50 | Pass | Pass | 7.0 | 5.0 | 0/15 | 0/15 |
| 53 | 0.9 | 0 | 0.50 | Pass | Pass | 7.0 | 7.0 | 0/15 | 0/15 |
| 54 | 0.95 | 0 | <0.25 | Pass | Pass | 8.0 | 7.0 | 0/15 | 0/15 |
| 56 | 0.85 | 0 | 0.25 | Pass | Pass | 6.0 | 6.0 | 0/15 | 0/15 |

EXAMPLE 50

Example 46 was repeated except that the amount of aluminium hydroxychloride was reduced to 53 g. This resulted in the molar ratio Al:Cl:PO$_4$ being changed to 1.0:1.5:2.0. The aluminium content was 0.75% by weight of the weight of primer (3.25% aluminium based on the weight of PTFE). The results obtained from coating a plaque as in Example 46 are quoted in the Table. It will be seen that the results from the crosshatching and 15 tape pull test were not as good as those obtained previously.

EXAMPLE 51

Example 46 was repeated but this time the amount of aluminium hydroxy chloride was increased to 159 g, the Al:Cl:PO$_4$ molar ratio being 1.0:0.83:0.67. The aluminium content was 2.1% of the weight of the primer (9.7% aluminium based on the weight of PTFE). The Table shows that good results were achieved.

EXAMPLE 52

Example 46 was repeated except that the phosphoric acid addition was reduced to 57.6 g, the Al:Cl:PO$_4$ molar ratio being 1:1:0.5. Good results were achieved as shown by the Table.

EXAMPLE 53

Example 46 was repeated except that the phosphoric acid addition was increased to 230 g to change the

I claim:

1. A method of making a coating composition which consists essentially of an aqueous dispersion containing a fluorocarbon polymer resin and, as binder, an aqueous solution identifiable as equivalent to a solution of an aluminum phosphate in a mineral acid, wherein the binder is prepared by mixing an aluminum hydroxychloride with an acid selected from the group consisting of phosphoric acids and mixtures of at least one phosphoric acid with at least one mineral acid selected from the group consisting of hydrochloric acid, sulphuric acid and nitric acid, and dispersing the fluorocarbon polymer resin in the aqueous binder solution, the weight of fluorocarbon polymer resin in the coating composition being from 1% to 60% by weight based on the weight of the composition, the amount of the binder in the composition being such that the weight of aluminum divided by the weight of the fluorocarbon polymer resin is from 0.02 to 0.25, the ratio of the number of aluminum atoms to the number of mineral acid molecules, whether added as mineral acid or derived from the aluminum hydroxychloride by reaction with the phosphoric acid or both, being from 1:0.1 to 1:5 and the ratio of the number of aluminum atoms to the number of atoms of phosphorus being 1:$x$ where $x$ is up to 2.

2. The method according to claim 1 wherein the fluorocarbon polymer resin dispersed in the aqueous binder solution is introduced by adding to the aqueous binder solution an aqueous dispersion of the fluorocarbon polymer resin.

3. The method according to claim 2 wherein the aqueous dispersion of the fluorocarbon polymer resin has been made by an aqueous polymerization process.

4. The method according to claim 3 wherein the fluorocarbon polymer resin is selected from the group consisting of polytetrafluoroethylene and copolymers of tetrafluoroethylene with up to 2% by weight of at least one other ethylenically unsaturated monomer.

5. The method according to claim 2 wherein the aqueous dispersion of the fluorocarbon polymer resin has been made by dispersing the resin in powder form in an aqueous medium.

6. The method according to claim 5 wherein the fluorocarbon polymer resin is a lubricant grade of polytetrafluoroethylene.

7. The method according to claim 1 wherein the fluorocarbon polymer resin is dispersed in the aqueous solution of the binder by adding the resin in powder form directly to the binder solution and dispersing it therein.

8. The method according to claim 7 wherein the fluorocarbon polymer resin is a lubricant grade of polytetrafluoroethylene.

9. The method according to claim 1 wherein the aqueous binder solution is made by the addition of a phosphoric acid and hydrochloric acid to the aluminum hydroxychloride and wherein the fluorocarbon polymer resin is selected from the group consisting of polytetrafluoroethylene and copolymers of tetrafluoroethylene with up to 5% by weight of other ethylenically-unsaturated monomers.

10. The method according to claim 9 wherein the phosphoric acid is ortho phosphoric acid and the aluminum hydroxychloride is of the formula $$Al_2(OH)_5Cl.n.H_2O$$

where $n \geq 0$.

11. The method according to claim 1 wherein the weight of aluminum is from 0.2 to 8% by weight based on the total weight of the composition.

12. The method according to claim 9 wherein an aqueous dispersion of the fluorocarbon polymer resin is mixed with the binder solution and wherein the binder solution is prepared by reacting ortho phosphoric acid and hydrochloric acid with aluminum hydroxychloride according to the equation $$Al_2(OH)_5Cl.n.H_2O + HCl + 2H_3PO_4 \rightarrow 2AlPO_4 + 2HCl + water\ (n \geq O)$$

13. The method according to claim 1 wherein $x$ is up to 1.8.

14. The method according to claim 1 wherein the ratio of a number of atoms of aluminum to the number of atoms of phosphorus is between 0.5 and 1.8.

15. The method according to claim 1 wherein the ration of the number of atoms of aluminum to the number of atoms of phosphorus is between 0.5 and 1.5.

16. The method according to claim 1 wherein the ratio of the number of atoms of aluminum to the number of atoms of phosphorus is between 0.5 and 2.0.

* * * * *